July 10, 1962     W. S. BLOCK     3,044,051

POWER FAILURE DETECTOR

Filed Jan. 26, 1959

INVENTOR.
WILLIAM S. BLOCK
BY *Milton J. Chamberlain*
*Attorney*

3,044,051
POWER FAILURE DETECTOR
William S. Block, Arlington Heights, Ill., assignor to Vapor Heating Corporation, Chicago, Ill., a corporation of Delaware
Filed Jan. 26, 1959, Ser. No. 789,179
5 Claims. (Cl. 340—248)

This invention relates to power failure detectors and particularly to such detectors for monitoring the output of a plurality of power sources and producing a single indicating signal if any one or more of the monitored power sources ceases to supply power to its associated electrical load.

As arranged in the past, detectors of this general type have commonly included in their circuitry either cascaded relays or transistors. Such circuits have been objectionable, those employing cascaded relays because variation in ambient temperature through the range of temperatures normally encountered often caused malfunction, but also, and principally, because of unreliability. A single relay of the cascaded series may have a reliability factor as high as 0.9, but when cascaded, for example, with three other relays, the overall reliability factor drops to 0.65, an unsatisfactory level. Transistorized circuits may be arranged to overcome ambient temperature limitations but only by recourse to circuitry of a complex nature. Also, in order to isolate the individual circuits of a transistorized detector circuit it has been necessary to resort to similar complex circuitry. The complexity of the circuits is objected to for obvious reasons.

It is the object of the present invention to overcome the above noted limitations by providing a simple and lightweight power failure detector which is reliably operative throughout a wide range of temperatures, pressures, and variations in relative humidity and which is unaffected by vibration of relatively high frequency.

The invention may be described briefly as a physically interrelated series of monitoring circuits each arranged across a single power source and each incorporating either a light sensitive cell, a neon lamp, or both. Failure of the power source to supply power interrupts current flow through the monitoring circuit associated with that power source. Such interruption works upon the light sensitive cell or neon lamp of that circuit and causes a signal to be passed to a warning circuit. The independently powered warning circuit then communicates an audible or visual warning.

Figure 1:
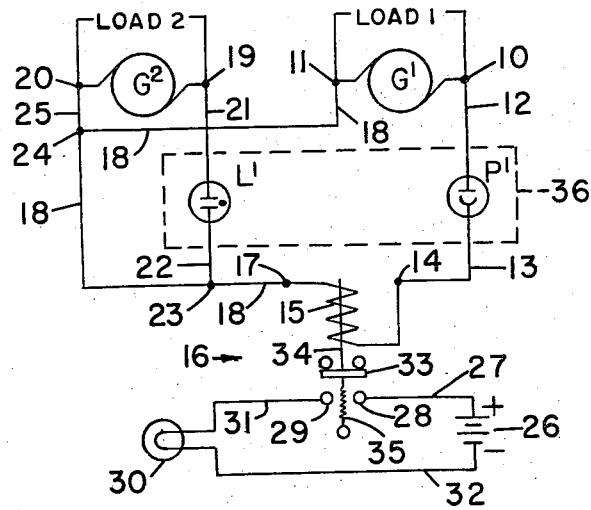
Figure 2:
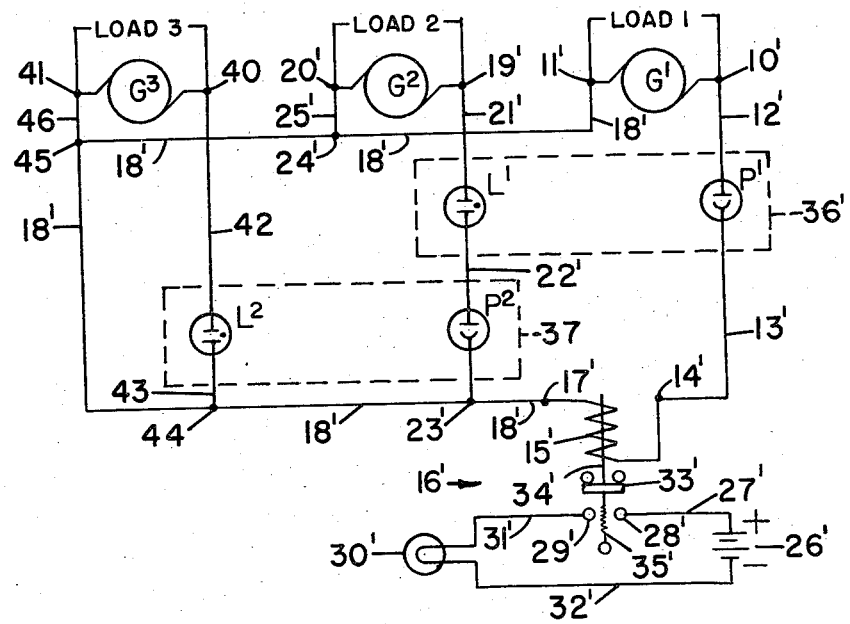

In the accompanying single sheet of drawings:

FIG. 1 is a schematic diagram of the basic power failure detector circuit as it may be applied to two power sources; and FIG. 2 is a schematic diagram of the power failure detector circuit showing the manner in which additional circuits may be added to the basic circuitry shown in FIG. 1 to cover additional power sources.

Referring now to FIG. 1, two generators $G^1$ and $G^2$ are shown supplying electrical energy to two load circuits designated, respectively, Load 1 and Load 2. The circuit for the monitoring circuit associated with the generator $G^1$, hereinafter termed a cell circuit, is connected across the terminals 10, 11 in parallel to the Load 1. From the terminal 10 the circuit may be traced through the line 12 to the light sensitive cell $P^1$, through line 13 to terminal 14. At terminal 14 the coil 15 of an electromagnetic relay designated generally by the reference numeral 16 is tied into the circuit which continues from terminal 17 through the line 18 back to terminal 11 of the generator.

The monitoring circuit across the terminals 19, 20 of generator $G^2$, hereinafter termed a lamp circuit, includes the line 21 to the neon lamp $L^1$, the line 22 to the junction 23 and thence via line 18 to the junction 24. Branch line 25 completes the circuit to terminal 20.

The warning circuit is independently powered as by a battery 26. The circuit includes the line 27 from the positive side of battery 26 to the contact 28 of the relay 16. An opposed contact 29 is connected to a warning device, here illustrated as a lamp 30, by the line 31. The line 32 completes the warning circuit to the negative side of battery 26. The contacts 28, 29 may be bridged by the contactor 33 when the magnetic field created by current flow through the coil 15 decays releasing the plunger 34. The spring 35 serves to bias the contactor 33 into its normally-closed position bridging the terminals 28, 29. With terminals 28, 29 bridged by the contactor 33 the warning circuit is completed illuminating the lamp 30. A warning is thereby communicated.

The light sensitive cell $P^1$ and the neon lamp $L^1$ are united in an assembly which has been blocked out by dotted lines in the drawings and designated by the reference numeral 36. The assembly consists of the cell $P^1$ and lamp $L^1$ encased in a light-proof capsule. The purpose of the assembly is to shield the light sensitive cell from all ambient light and expose it only to light rays emitted by the lamp $L^1$. The reason for this arrangement will be made clear presently.

The light sensitive cells selected for use in the monitoring circuits have a relatively high internal electrical resistance, on the order of twenty megohms, in the absence of light. Their internal resistance decreases to a relatively low value, on the order of five hundred ohms, when light from the neon lamps of the lamp-cell assemblies impinges upon the light-sensitive cells. In the absence of light the cell has sufficient resistance to block current flow through the monitoring circuit with which it is associated. By conditioning current flow through one circuit upon the presence or absence of light from a light source connected into another of the series of circuits, the monitoring circuits are physically interrelated.

The basic arrangement of FIG. 1 may be expanded to handle additional power sources as illustrated in FIG. 2. The components of the basic arrangement shown in FIG. 1 are pointed out in FIG. 2 by the same reference numerals as were used to describe the basic arrangement with a prime (') added so as to avoid needless repetition.

When the basic arrangement is expanded, a light sensitive cell is interposed in the lamp circuit across the power source $G^2$. It is here illustrated as having been inserted in the conductor 22' between the lamp $L^1$ and the junction 23'. The cell $P^2$ and the lamp $L^2$, each identical, respectively, to the cell $P^1$ and lamp $L^1$ described above, are enclosed in a capsule 37 likewise identical to the capsule 36. The lamp $L^2$ of the lamp-cell assembly 37 is connected into a monitoring circuit across the terminals 40, 41 of the added power source $G^3$. This circuit, hereinafter termed a lamp-cell circuit, starting at the terminal 40, includes the line 42 to lamp $L^2$, line 43 to junction 44 with the line 18'. Thence, via line 18', to the junction 45 from whence the branch line 46 completes the circuit to terminal 41.

Additional monitoring circuits may be added in the same manner that the circuit for the power source $G^3$ has been added to that for the power sources $G^2$ and $G^1$. The series of associated circuits for a greater number of power sources will always consist of one cell circuit and one lamp circuit with a number of lamp-cell circuits lesser by two than the number of power sources being monitored, since a lamp circuit and a cell circuit in the case of a detector having merely two power sources will effect the desired warning as to these initial sources, and the combination lamp and cell circuits will be used for each additional power source.

Operation

When both power sources of FIG. 1 are functioning properly there will be a flow of current across the terminals 10, 11 and 19, 20, respectively through the two monitoring circuits described. Current flow through the lamp circuit illuminates the lamp $L^1$, the effect of which is to lower the resistance of the light sensitive cell $P^1$ permitting current to flow through the cell circuit, energizing the armature 15 and holding the plunger 34 and contactor 33 in the position shown, opening the warning circuit.

Should the power source $G^2$ fail, current will cease to flow through the lamp circuit, and the lamp $L^1$ will be extinguished. Extinguishment of the lamp causes the resistance of the cell $P^1$ to go to the high value described interrupting current flow through the cell circuit. This interruption permits the plunger 34 to drop out and the contactor 33 will bridge the contacts 28, 29 closing the warning circuit and illuminating the warning lamp 30.

Should the power source $G^1$ fail, there will be no current flow through the cell circuit. This failure will cause the energization of the warning lamp 30 in the manner just described.

Thus it can be seen that failure of either power source of the basic detector circuit illustrated in FIG. 1 will produce a single indicating signal which is utilized to communicate a warning.

Turning now to the augmented detector of FIG. 2, failure of either of the power sources $G^1$ or $G^2$ will cause warning to be given in the same manner as outlined above. Should the power source $G^3$ fail, current will cease to flow through its monitoring circuit extinguishing the lamp $L^2$. Such a failure is communicated to the monitoring circuit across the terminals of power source $G^2$ by the lamp-cell assembly 37 in the manner already detailed thereby increasing the internal resistance of the light-sensitive cell $P^2$. The increased resistance of $P^2$ effectively curtails current flow through the lamp-cell circuit, extinguishing the lamp $L^1$, which in turn causes an increase in the resistance of cell $P^1$ interrupting its circuit, de-energizing the relay 16, and energizing the warning circuit.

If circuits for a fourth, fifth or more power sources are incorporated into the detector circuitry of FIG. 2, the operation explained above will occur across the series of circuits. The lamp-cell assemblies used to physically inter-relate the monitoring circuits are each identical to the assemblies shown either at 36 or 37. The lamp-cell assemblies are cascaded in the manner shown in FIG. 2 so as to be compatible with the monitoring circuits required. There will always be a number of lamp-cell assemblies associated with the power failure detector lesser by one than the number of power sources being monitored.

The power failure detector as it is associated with the warning circuit is inherently fail-safe because of the arrangement of the relay 16. As previously mentioned, its contacts 28, 29 are normally closed. Thus any but a true power signal from each of the power sources being monitored will communicate a warning signal.

I claim:
1. A power failure detector for monitoring the output of at least three separate electrical energy sources comprising, a first signal transmitter energizable by a first of the sources, a second signal transmitter, a first signal receiving means rendered operative by the signal from the first signal transmitter for connecting the second signal transmitter in energy coupling relation with the second source for energization thereby, an electrical control means, a second signal receiving means rendered operative by the signal from the second signal transmitter for connecting the electrical control means in energy coupling relation with the third source for energization thereby, and warning signal means controlled by the control means to provide a warning upon deenergization of the control means in response to failure of any one of the sources.

2. A power failure detector as defined by claim 1, in which the electrical control means includes a relay having normally closed contacts which are opened upon energization of the relay, the warning device being operated by a further source of energy through the closed contacts of the relay.

3. A power failure detector for monitoring the output of at least three separate electrical energy sources comprising, a first lamp energizable by a first of the sources, a second lamp, a first photoelectric device rendered operative by the illumination from the first lamp for connecting the second lamp in energy coupling relation with the second source for illumination thereby, an electrical control means, a second photoelectric device rendered operative by the illumination from the second lamp for connecting the control means in energy coupling relation with the third source, and a warning signal device controlled by the control means to provide a warning upon deenergization of the control means due to failure of any power source.

4. A power failure detector as defined by claim 3, in which the first photoelectric device is a photoresistive element which is connected in series with the second lamp across the second source.

5. A power failure detector as defined by claim 3, in which the second photoelectric device is a photoresistive element which is connected in series with the electrical control means across the third source.

References Cited in the file of this patent

UNITED STATES PATENTS

| | | |
|---|---|---|
| 1,736,993 | Breisky | Nov. 26, 1929 |
| 2,404,696 | Deal | July 23, 1946 |
| 2,783,458 | Hammer | Feb. 26, 1957 |